United States Patent [19]

Schäfer et al.

[11] Patent Number: 4,730,432
[45] Date of Patent: Mar. 15, 1988

[54] MOLDING TRACK FOR CARPETING

[75] Inventors: Willi Schäfer, Feldafing; Gunther Sepp, Ottobrunn, both of Fed. Rep. of Germany

[73] Assignee: Raumausstattung Willi Schafer, Tutzing, Fed. Rep. of Germany

[21] Appl. No.: 7,735

[22] Filed: Jan. 28, 1987

[30] Foreign Application Priority Data

May 20, 1986 [DE] Fed. Rep. of Germany ....... 3616916

[51] Int. Cl.⁴ ............................................. E04F 19/04
[52] U.S. Cl. ....................................... 52/716; 52/287; 52/288; 16/7
[58] Field of Search ................ 52/287, 288, 220, 273, 52/222, 716; 16/7, 5, 4; 160/382, 391, 398, 399

[56] References Cited

U.S. PATENT DOCUMENTS 3,568,386  3/1971  Gossen .................................. 52/288
4,304,073 12/1981  Reith .................................... 52/716

FOREIGN PATENT DOCUMENTS 15551    12/1933  Australia .............................. 52/716
2716440  10/1978  Fed. Rep. of Germany .
2715211  12/1978  Fed. Rep. of Germany .
2731928   2/1979  Fed. Rep. of Germany .
3127743   2/1983  Fed. Rep. of Germany .
3238614   4/1984  Fed. Rep. of Germany .
3408784   9/1985  Fed. Rep. of Germany ........ 52/244
3429715   2/1986  Fed. Rep. of Germany .
594794    1/1978  Switzerland ......................... 52/287
1032103   6/1966  United Kingdom .................. 52/288

Primary Examiner—John E. Murtagh
Attorney, Agent, or Firm—Karl F. Ross; Herbert Dubno

[57] ABSTRACT

The invention concerns a molding track for the installation of carpet molding trim. It possesses an asymmetrical two-lipped profile, one lip of which is fastened to the wall. The molding trim is fastened flush with the floor to the other lip, led upward around this lip, which is elastically prestressed in the direction of the wall, and clamped firmly. Electrical wiring can be installed subsequently in the hollow spaces provided for this purose. The profile can be manufactured of recycled material.

15 Claims, 6 Drawing Figures

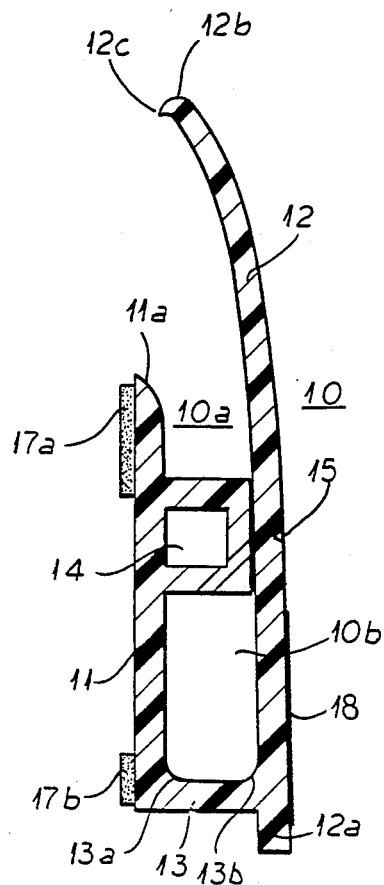
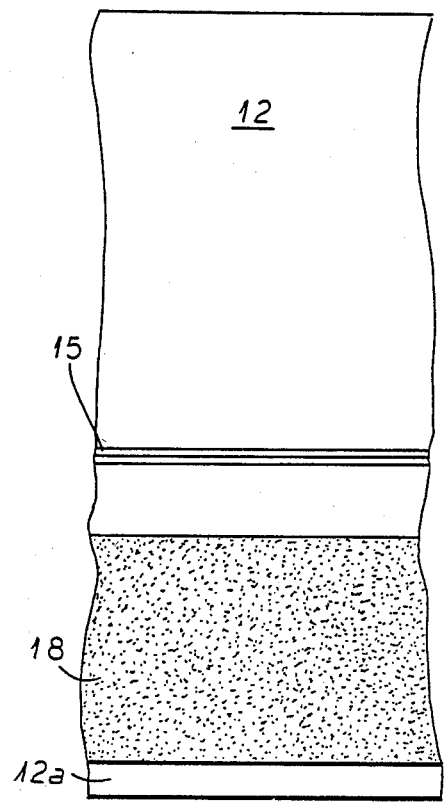
FIG.1  FIG.1A
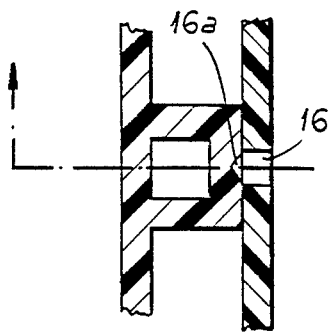
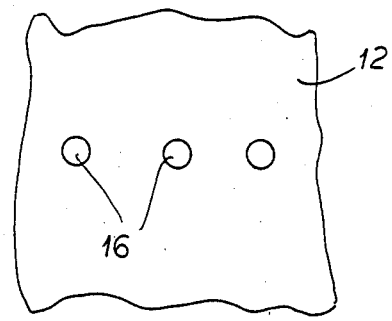
FIG.3  FIG.3A

MOLDING TRACK FOR CARPETING

FIELD OF THE INVENTION

Our present invention relates to a molding track for the mounting of carpeting strip and, more particularly, to a one-piece, asymmetrical two-lipped profile of elastic material having a rear lip and a taller front lip. After the floor carpeting is laid, this molding track can be affixed to the wall flush with the floor. Subsequently, the molding trim, preferably of the same carpeting material, is fastened flush with the floor to the front lip, folded over this front lip and stuck fast into a pocket provided for this purpose by the profile.

BACKGROUND OF THE INVENTION

Such a molding track as well as a process for laying carpet and applying a carpet-molding-trim has been described by us in German Offenlegungschrift (open patent application) DE-OS No. 3429715.

This molding trim has proved to be a trail blazing innovation and has produced excellent results. Nevertheless, it possesses a number of disadvantages, which have now been eliminated through further inventive measures.

This earlier molding track requires for reliable adhesion to uneven wall surfaces elaborate fastening devices, which must be coated with adhesive material or be suitable for the application of an adhesive coating.

In order to obtain the desired elastic properties of the molding track, the two lips are constructed with a cross section which narrows toward the top. These two conditions require an extremely complicated profile with a wide variation in the individual cross sections.

The manufacture of this molding track by extrusion requires, therefore, on the one hand correspondingly complex and elaborate extruding tools. On the other hand, the manufacturing process must be very carefully overseen in order to avoid an excessive reject rate due to the differing wall thicknesses.

In addition, making such a profile requires high quality raw materials. So called recycled plastic or synthetic resin made from waste materials of varying composition would lead in this case to an excessively high rejection rate.

A further drawback of the fastening devices is the space they take up, so that only a relatively narrow strip of the molding trim can be clamped in between the wall and front lip. This can, under certain circumstances, lead to unsatisfactory retention of the trim strip and requires, in addition, a narrower tolerance in the width of the trimming strip. Moreover, sliding of the molding trim in between the front lip and the topmost part of the fastening device is made more difficult by the nonstreamlined, boxy form of the latter.

Application of the adhesive to the fastening surface requires close attention, in spite of which a considerable amount of the adhesive material makes its way into the spaces between the fastening devices, leading to a wasteful increase in consumption of adhesive material.

Because of the springy elastic behavior of the fastening devices, the additional securing of the molding track by means of nails provided for optionally requires both greater dexterity and a high quality of plastic material in order to prevent splintering of the rear lip and fastening device under the blows of the hammer. If a molding track must be nailed fast at another position at which there happens to be no passage hole, a corresponding hole must be bored here at a precisely measured position in order to avoid damage to the fastening device.

The corners and hollow spaces of the molding track provided for laying electrical wiring are no longer accessible after the molding track has been mounted; hence an initial electrical installation can no longer be changed.

OBJECT OF THE INVENTION

It is an object of the present invention to provide an improved molding track of the above named type which avoids the drawbacks mentioned, i.e. which can be manufactured in a simpler fashion from recycled material, is more easily and reliably installed, fastens the molding track more securely, and permits subsequent installation of electrical wiring.

SUMMARY OF THE INVENTION

This object and others which will become apparent hereinafter are attained in accordance with the invention, in a molding track for the installation of carpet molding trim, constructed in the form of an asymmetrical two-lipped profile of elastic material with a rear lip and a taller front lip wherein the molding track consists of nearly flat surfaces meeting at nearly right angles, of essentially constant cross section. The rear lip is completely planar and somewhat more than half as tall as the front lip and connected by a corresponding floor slightly wider than commonly marketed carpet thicknesses, with rounded corners, to the front lip. The latter has an overhang of about half a carpet thickness. The rear lip bears a nail or anchor chamber of approximately square cross section of approximately the dimensions of a carpet thickness somewhere between the middle and the upper third of its height, on the side of which facing the front lip the lip reposes areally (i.e. in surface contact) by virtue of prestressing.

The molding track can be constructed by the process of extrusion as a single piece or in two pieces which can snap together. The track may be constituted of recycled plastic material with the addition of a modifier.

The ends of the rear lip are provided with adhesive strips of sufficiently thick, soft, tough, and adhesive material.

The front lip is formed with a nail groove on the side facing away from the rear lip at the height of the middle of the nail chamber.

In addition, the front lip can have an adhesive strip of thin adhesive material between the nail groove and its lower extremity.

The front lip can have a sequence of passage holes along the nail groove spaced about 20 cm apart of slightly larger diameter than the heads of the nails or screws to be used for fastening, corresponding to which are conical depressions in the side of the nail chamber facing the front lip.

The prestressing which presses the front lip against the nail chamber can be produced by additional heating or cooling of the corresponding outer or inner side of the molding track immediately upon its leaving the extruder.

The part of the front lip above the nail chamber can be slightly bent toward the rear lip and exhibits at its upper extremity a sharply convergent end-lip with a ridge directed inwards.

The space between the lips, the floor and the nail chamber can form a channel for the subsequent installation of electric wiring.

The molding track can be constructed in two pieces whereby the front lip can be inserted or plugged into the rear lip by means of a clamp or plug contact located in the lower region of the molding track and taken out again.

The plug contact can consist of a clamping barb or plug at the lower extremity of the rear lip and clamping lips at corresponding positions on the front lip.

The clamping barb can have convex protrusions and the clamping lips can have corresponding concave depressions.

The clamp/plug connection of the two piece molding track can have the same stiffness as the corresponding region of the one piece molding track and produces the same prestressing between the two lips.

BRIEF DESCRIPTION OF THE DRAWING

The above and other objects, features and advantages of the present invention will become more readily apparent from the following description, reference being made to the accompanying drawing in which:

FIG. 1 is a cross section of the one piece molding track with adhesive strip;

FIG. 1A is a fragmentary front elevation of the track;

FIG. 3 is a detailed cross section of the molding track with nail groove, passage hole, and nail chamber with conical depression;

FIG. 3A is a corresponding front elevation; and

SPECIFIC DESCRIPTION

Figure 2:
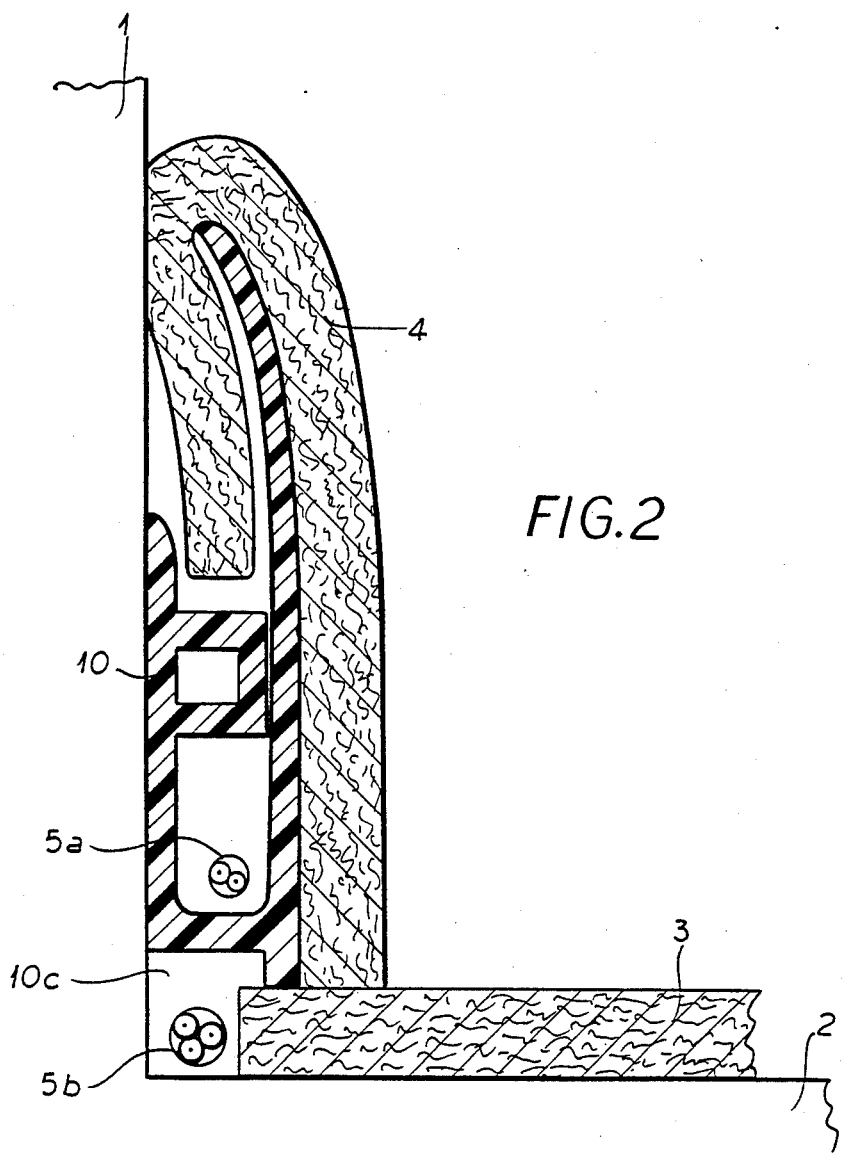
FIG. 2 is a cross section of the one piece molding track mounted and fastened in place along with the molding trim and floor carpet.

As shown in FIGS. 1 and 1A, the molding track 10 has a two lipped profile with a rear lip 11 and a taller front lip 12.

The profile is characterized by nearly plane portions of essentially constant cross section meeting at nearly right angles. This enables a simple manufacturing process using simple tools and recycled material. In order to increase the resistance to hammering, an additive of a commercially available modifier such as ABS (Acrylonitrile-Butadiene-Styrene-Copolymer) to the recycled PVC (Polyvinylchloride) used.

The rear lip 11 is completely planar and somewhat more than half as tall as the front lip 12 so that a sufficiently large adhesive surface is available and no problems arise in applying the adhesive. When using adhesive material, good adhesion is achieved without any special elaboration of the fastening surfaces by the fact that two adhesive strips 17a, 17b of sufficiently thick, soft and tough adhesive material are mounted on the ends of the rear lip 11, which sufficiently compensate for the degree of wall 1 uniformity or lack thereof generally encountered in practice.

The elastic properties of the molding track 10 should ensure that the molding trim strip 4, after installation, runs straight and slips upwards with a slight inclination to the wall, and be curved in its upper breadth toward the wall 1 (see FIG. 2). This is achieved by the molding track described in the invention in spite of the essentially constant thickness or cross section of all surfaces by means of the following measures:

The two inner corners 13a, 13b formed by the floor 13 and the lips 11 and 12 are rounded inwards, i.e. are rounded fillets, in order to avoid the reduction in stiffness which would otherwise be caused by the notch effect.

The rear lip 11 is not susceptible to deformation, as is that of the previously described molding track, as a result of inserting the molding trim since it is fastened directly to and flatly on the wall 1 and, moreover, although it is relatively short, it attains sufficient stiffness by virtue of the nail chamber 14 with its closed, square cross section.

The front lip 12 already lies pressed against the nail chamber 14 before insertion of the molding trim 4. This is achieved by means of a corresponding tempering procedure during the process of manufacturing, i.e. by means of additional heating or cooling of the corresponding outer or inner sides, respectively, of the molding track 10 immediately upon its emergence from the extruder.

A possible slight deformation of the front lip 12 in the form of an S-curve after insertion of the molding trim 4 remains invisible since the molding trim 4 is only fastened along its lower breadth to the lip 12 and therefore does not adopt the serpentine deformation of lip 12 because of its stiffness. This adhesive foil is used for the adhesive strip 18, which secures commercially available carpeting bridges very reliably without forming a bulge or adding to the bulk.

Thus the molding trim 4 has the desired pleasant form after installation although the molding track 10 described in the patent exhibits a greatly simplified profile in comparison with those previously described.

The nail chamber 14 serves for fastening the molding track 10 to the wall 1 by means of nails or screws. During manufacture, passage holes 16 are drilled at a spacing of approximately 20 cm through the front lip 12 such that the nail chamber 14 receives corresponding centered conical depressions 16A (see FIG. 3). Thus during nailing or screw fastening the nails or screws center themselves automatically and fasten the molding track 10 by means of nail chamber 14 to the wall 1. The fasteners, i.e. the nail or screw head, fit through the passage holes 16 drilled correspondingly oversized and do not hinder the free movement of lip 12.

The front lip 12 will not splinter during nailing even if recycled material, with the addition of a modifier where needed for strengthening, is used since the lip 12 reposes areally on the nail chamber 14. The nail chamber itself cannot be damaged by blows of the hammer either because of its stiff, square, closed cross section.

The front lip 12 is traversed at the height of the passage holes 16 by a nail groove 15 which acts as a marker so that when needed, additional passage holes 16 can be drilled without exact measurement or marking.

The nail chamber 14 has a slightly smaller side length than the floor 13. The front lip 12 is thereby slightly inclined toward the rear lip 11, which results in a more pleasant appearance of the finished product after installation. The nail chamber 14 is placed somewhere between the middle and the upper third of the rear lip 11. It is thus located sufficiently high in order to avoid the lower region between wall 1 and floor 2 which is inconvenient for nailing or screwing. It lies sufficiently high however to fasten the rear lip 11 securely to the wall 1.

By virtue of the configuration of the nail chamber 14 and the rear lip 11, the pocket 10a formed for receiving the molding trim 4 is enlarged in comparison with the previously described molding track. A greater breadth of molding trim 4 can thus be inserted, which provides for a more secure fastening. In addition, the molding trim 4 need no longer be cut to within a narrowly prescribed breadth. The insertion of the molding trim 4 up to a maximum determined by the nail chamber 14 is rendered unproblematic by the rounding or bevelling 11a of the lip 11. By virtue of the inward pointing ridge 12b resembling a blade on the lip 12 terminating in the pointed (narrowing, convergent) end-lip 12c, the molding trim 4 is additionally secured against being unintentionally pulled back out.

The hollow space 10b between the lips 11 and 12, the floor 13 and the nail chamber 14 remains accessible even after fastening the molding track 10 to the wall 1. For this purpose, the molding trim 4 is taken back out (unfolded) and the lip 12 is forced away from the nail chamber by means of a suitable tool. In this manner a subsequent installation of electrical wiring 5a can proceed without difficulty.

Figure 4:
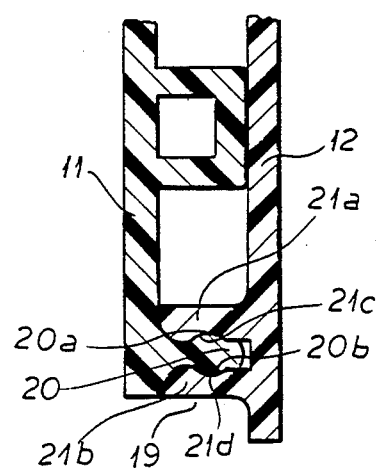
FIG. 4 is a detailed cross section of the two piece version of the molding track with plug-and-socket clamp connection.

In the two piece version of the molding track 10 (see FIG. 4) the two lips 11 and 12 are connected to one another by means of a removable plug-in/clamping contact 19. This consists of a plug or barb 20 mounted on the rear lip 11 with convex protrusions 20a, 20b and clamping lips 21a, 21b placed at the corresponding position on the front lip 12 with correspondingly formed concave depressions 21c, 21d. In order to achieve the same elastic properties as the one piece version, the plug/clamp contact 19 is placed at the lower end of the molding track 10 corresponding to the floor 13. Likewise, the plug/clamping-barb 20 and the clamping lips 21a, 21b are provided with rounded inner corners in order to avoid a reduction in stability caused by notching (tearing at the corner).

Although this version consists of two profiles instead of one, it can be advantageous in comparison with the one piece version. On the other hand, the manufacturing process is simpler. Since the rear lip need not withstand elastic deformations of long duration, it can be made of lower quality raw material than the front lip 12 with the clamping lips 21a, 21b. The two piece molding track 10 encloses, with the exception of the unimportant nail chamber 14, no hollow spaces, so that a certain amount of effort is thereby saved in its manufacture according to precise dimensional specifications. And the tempering of the profile in order to produce the prestressing of the front lip against the rear lip becomes unnecessary as since this prestressing is produced by a slight inclination of the two lips 11 and 12 with respect to the plug/clamp contact 19 upon fitting together the two lips 11 and 12.

On the other hand, the hollow space 10c between wall 1, floor 2 and floor carpeting 3 is accessible even after fastening the rear lip 11 to the wall 1 since the front lip 12 can be removed from the rear lip 11 by virtue of the separable plug/clamp connection 19. In this manner the subsequent installation of electrical wiring 5b is possible even in this hollow space 10c without further ado.

The drawing may not be strictly to scale and simply indicates the features essential to the concept of the invention. These features can be altered or enlarged upon without deviation from the fundamental idea of the invention. For example, the form and placement of the nail chamber 14 and the plug/clamp contact 19 can be altered without changing the constructive functions of these parts. The height of the molding track 10 can be adapted to the widest variety of tastes. Likewise the molding track 10 can be manufactured in two additional thicknesses for extremely thin or extremely thick carpeting material. Even the wall thickness of the profile can be adapted to the carpet thickness, the height of the molding track 10 and the profile material.

The two piece version offers the advantage in the case of renovations that the rear lip 11 can remain fastened to the wall 1 and the front lip 12 can be replaced by a different one of, for example, a different height and thus adjusted to a floor carpeting 3 of different thickness.

The following dimensioning of the molding track 10 has proved advantageous for normal applications:
Height: 55 mm
Total Thickness: 10 mm
Wall strength (of profile): 1.3 mm
Thickness of read adhesive strip: 1 mm The molding track 10 can be manufactured with or without the two rear adhesive strips 17a, 17b and/or the adhesive strip 18. For an extremely nonplanar wall 1, a glue coating on the wall 1 and molding track is recommended instead of the adhesive strips 17a, 17b. Likewise, for carpets with a synthetic second back, coatings of glue on the carpet back and molding track are recommended instead of the adhesive strip 18. A further version with an adhesive strip 18 of the same material as the adhesive strip 17a, 17b can be advantageous here as well. Finally, the surfaces provided for the adhesive strip or glue coating can be roughened during manufacture in order to achieve a more secure fastening by the glue, i.e. the adhesive material.

By means of the measures described, a molding track is created which, in comparison with the current state of the art, can be manufactured with much less effort, can be more easily installed, ensures a better finished result, and allows a subsequent installation of electrical wiring.

We claim:

1. A molding track for the installation of carpet trim for a carpet of a given thickness, comprising an asymmetric profile composed of an elastic material and having
    an upright front lip over which said carpet can be placed and folded;
    an upright rear lip spaced from and shorter than said front lip but having a height which is slightly more than half the height of said front lip;
    a floor having a width slightly greater than said thickness connecting bases of said lips and lying generally perpendicular thereto, rounded fillets being formed between said lips and said floor internally of said profile;
    means forming an anchor chamber on said rear lip of generally square cross section, of a width approximately equal to said thickness, and at a location generally between a middle and upper third of the height of said rear lip for receiving a fastener traversing said front lip in a region of contact between said front lip and said chamber, said rear lip being generally flat except for said anchor chamber, said front lip being resiliently biased toward surface engagement with said chamber in said region; and an overhang projecting by substantially half said thickness downwardly generally perpendicularly to said floor in a plane of said front lip.

2. The molding track defined in claim 1 wherein said profile is formed in a single piece.

3. The molding track defined in claim 1 wherein said profile is an extrusion of recycled plastic material containing a modifier.

4. The molding track defined in claim 1, further comprising adhesive strips on said rear lip exteriorly of said profile at an upper end and at a lower end of said rear lip, respectively, for adhering said profile to a wall.

5. The molding track defined in claim 1, further comprising a nail groove formed on an exterior surface of said front lip at a portion thereof opposite said region and at a location substantially on a level with the middle of said chamber for permitting nails, forming said fasteners, to be accurately driven through said front lip into said chamber.

6. The molding track defined in claim 5, further comprising an adhesive strip on an exterior surface of said front lip between said nail groove and a lower end of said front lip.

7. The molding track defined in claim 1 wherein said front lip is formed with a row of holes adapted to be traversed by said fasteners, at a portion of said front lip opposite said region, and at a location substantially on a level with the middle of said chamber, said holes being spaced apart by about 20 cm and having diameters slightly larger than diameters of heads of said fasteners, said chamber having a wall juxtaposed with said region and formed with conical depressions registering with said holes.

8. The molding track defined in claim 1 wherein the resilient bias of said front lip aqainst said chamber is induced by additional heating of an exterior surface of said front lip immediately upon said profile leaving an extruder in which it is formed.

9. The molding track defined in claim 1 wherein the resilient bias of said front lip against said chamber is induced by additional cooling of an interior surface of said front lip immediately upon said profile leaving an extruder in which it is formed 10. The molding track defined in claim 1 wherein said front lip has a free extremity remote from said wall slightly bent toward said rear lip and formed with a sharply convergent end edge ridge directed inwardly.

11. The molding track defined in claim 1 wherein said profile is formed between said chamber and said wall and between said lips with a channel extending along said track to receive electrical wiring.

12. The molding track defined in claim 1 wherein said front lip is formed as one part and said rear lip is formed as another part of a pair of separable parts having plug-and-socket formations enabling coupling of said parts, said formations forming said wall.

13. The molding track defined in claim 12 wherein said formations include a barb-forming plug formation at a lower end of said rear lip and a socket formation formed by a pair of clamping lips on said front lip, said clamping lips being engageable with said plug formation.

14. The molding track defined in claim 13 wherein said plug formation has convex protrusions on opposite sides thereof and said clamping lips have concave depressions complementarily receiving said protrusions.

15. The molding track defined in claim 12 wherein said resilient bias is generated by the interfitting of formations of said plug-and-socket formations.

* * * * *